(12) United States Patent
Schaller et al.

(10) Patent No.: US 7,556,157 B2
(45) Date of Patent: Jul. 7, 2009

(54) DENSITY CURRENT BAFFLE FOR A CLARIFIER TANK

(76) Inventors: Earle Schaller, 32 Bermuda Lake Dr., Palm Beach Gardens, FL (US) 33418; Elaine Schaller, 32 Bermuda lake Dr., Palm Beach Gardens, FL (US) 33418

( * ) Notice: Subject to any disclaimer, the term of this patent is extended or adjusted under 35 U.S.C. 154(b) by 0 days.

(21) Appl. No.: 11/974,512

(22) Filed: Oct. 12, 2007

(65) Prior Publication Data

US 2008/0185334 A1  Aug. 7, 2008

Related U.S. Application Data

(60) Provisional application No. 60/899,327, filed on Feb. 2, 2007.

(51) Int. Cl.
*B01D 21/02* (2006.01)
(52) U.S. Cl. .............. 210/521; 210/528; 210/532.1; 210/541; 220/660
(58) Field of Classification Search ......... 210/521, 210/525, 528, 532.1, 541; 220/654, 660
See application file for complete search history.

(56) References Cited

U.S. PATENT DOCUMENTS

| | | | |
|---|---|---|---|
| 707,567 A | 8/1902 | Edson | |
| 2,150,157 A | 3/1939 | Franklin | |
| 2,422,394 A | 6/1947 | Carter | |
| 2,509,933 A | 5/1950 | Lind | |
| 2,679,477 A | 5/1954 | Kivari et al. | |
| 2,790,372 A | 4/1957 | Cooper | |
| 2,826,306 A | 3/1958 | Burns | |
| 3,184,065 A | 5/1965 | Bradford | |
| 3,353,676 A * | 11/1967 | Adler ................. | 210/528 |
| 3,385,786 A | 5/1968 | Klock | |
| 3,489,287 A | 1/1970 | Steander | |
| 3,849,311 A | 11/1974 | Jakubek | |
| 4,011,164 A | 3/1977 | McGivern | |
| 4,202,778 A | 5/1980 | Middelbeek | |
| 4,346,005 A | 8/1982 | Zimmerman | |
| 4,380,748 A | 4/1983 | Hill et al. | |
| 4,390,422 A | 6/1983 | Mackrle et al. | |

(Continued)

FOREIGN PATENT DOCUMENTS

EP    95940592.9    11/1995

(Continued)

OTHER PUBLICATIONS

International Search Report dated Jul. 25, 2008.

(Continued)

*Primary Examiner*—Christopher Upton
(74) *Attorney, Agent, or Firm*—Sofer & Haroun, LLP (57) ABSTRACT

A density current baffle for use in a clarifier tank has a first baffle portion having a lower end, an upper end and an intermediate central portion. The lower end of the baffle portion is coupled to a side wall of the clarifier tank. The upper end of the baffle portion being disposed away from the side wall of the clarifier tank. The intermediate central portion between the lower end and the upper end, the baffle portion is curved such that the upper end curves inward towards the center of the tank.

8 Claims, 7 Drawing Sheets

U.S. PATENT DOCUMENTS

| | | |
|---|---|---|
| 4,391,704 A | 7/1983 | Anderson |
| 4,531,455 A | 7/1985 | Palmer |
| 4,584,802 A | 4/1986 | Casselman et al. |
| 4,613,434 A | 9/1986 | Maatta |
| 4,664,794 A | 5/1987 | Mackrle et al. |
| 4,706,418 A | 11/1987 | Stewart |
| 4,710,292 A | 12/1987 | DeVos |
| 4,758,339 A | 7/1988 | Vellinga |
| 4,767,536 A | 8/1988 | Roley |
| 4,780,206 A | 10/1988 | Beard et al. |
| 4,816,157 A | 3/1989 | Jennelle |
| 4,830,748 A | 5/1989 | Hall |
| 4,847,926 A | 7/1989 | Laputka |
| 4,876,010 A | 10/1989 | Riddle |
| 4,899,505 A | 2/1990 | Williamson et al. |
| 5,049,278 A | 9/1991 | Galper |
| 5,139,657 A | 8/1992 | Nojima et al. |
| 5,176,823 A | 1/1993 | Roley |
| 5,227,077 A | 7/1993 | Shea |
| 5,252,205 A | 10/1993 | Schaller ..................... 210/232 |
| 5,286,392 A | 2/1994 | Shea |
| 5,344,563 A | 9/1994 | Noyes ....................... 210/621 |
| 5,597,483 A | 1/1997 | Schaller |
| 5,670,045 A | 9/1997 | Schaller |
| 5,688,400 A * | 11/1997 | Baxter, Sr. .................. 210/525 |
| 5,965,023 A | 10/1999 | Schaller |
| 6,113,800 A | 9/2000 | Hopkins et al. ............. 210/703 |
| 6,216,881 B1 | 4/2001 | Schaller |
| 6,712,222 B2 | 3/2004 | Schaller |
| 7,416,662 B2 * | 8/2008 | Aditham et al. ............. 210/521 |
| 2008/0230463 A1 * | 9/2008 | Schaller et al. .......... 210/532.1 |

FOREIGN PATENT DOCUMENTS

JP              3408542         3/2003

OTHER PUBLICATIONS

International Search Report dated Oct. 12, 2007.

* cited by examiner

DENSITY CURRENT BAFFLE FOR A CLARIFIER TANK

RELATED APPLICATION

This application claims the benefit of priority from U.S. Provisional Patent Application No. 60/899,327 filed on Feb. 2, 2007, the entirety of which is incorporated herein by reference.

FIELD OF THE INVENTION

The present invention is in the field of wastewater treatment clarifier tanks. More particularly, the present invention is in the field of density current baffles used in clarifier tanks.

BACKGROUND

In the field of waste water treatment, clarifier tanks are used to separate waste solids from the water as one of the last stages of treatment. The clarifier tanks typically consist of a circular or rectangularly-configured tank in which a centrally mounted, radially-extending arm is slowly moved or rotated about the tank at or proximate the surface of the carrier liquid.

Waste water enters the tank either through the bottom of the tank or through some other entry port. Thereafter, the aim is to have the solid waste, or sludge, settle to the bottom of the tank with the cleaner water escaping over a weir into an effluent or launder channel before final processing and release to the environment.

A major deterrent to effective solids removal is the presence of sludge density currents that form within the tank. These currents create hydraulic short circuits that bypass the tanks' main clarification volume. and allow solids to enter the effluent. The effectiveness of clarifier tanks is measured in the amount of total suspended solids (TSS) that leave the clarifier tank through the effluent channel.

In order to reduce the TSS output into the effluent channel, a number of modifications have been made to these tanks, one of which is commonly referred to as a density current baffle. These baffles, situated along the outer wall of the tank, facing inward and downward, are designed to redirect these currents back towards the center of the tank and thus away from the effluent channel.

In the past several attempts have been made to design effective bafflers for such clarifier tanks.

For example, U.S. Pat. No. 4,780,206 to Beard et al. relates to a turbulence control system for an intra-channel clarifier which reduces turbulence within and allows the removal of sludge from the clarifier.

U.S. Pat. No. 4,816,157 to Jennelle is directed to an apparatus and method for clarifying solids from a solids-containing liquid having a multilayer baffle system and integral solids removal sump. The multilayer baffle system includes a first set of baffles placed above the main liquid flow path for minimizing horizontal flow and creating local turbulence so as to promote settling and assure that no solids settle on the baffles.

U.S. Pat. No. 5,049,278 to Galper relates to a modular plate settler for use in a liquid clarifier system having one or more inlet ports for receiving an influent flow of liquid. The modular plate settler comprises a parallelogram-shaped enclosure provided with a full bottom opening for receiving the influent flow of liquid from the settling tank.

U.S. Pat. No. 5,252,205 to Schaller is directed to an improved baffle system which is constructed as a modular unit and that consists of a plurality of inter-engaged individual baffles, each formed as a unitarily-integrated element incorporating both the panel member and an integral end bracket for suspended securement of the baffle to the peripheral wall of the clarifier tank.

Finally, U.S. Pat. No. 5,597,483 to Schaller is directed to a vented baffle system where one or more of the baffles are provided with a relief valve means for venting the pressure in a space formed between the junction of the lower side of the panel member and the peripheral tank wall. The resulting system provides a vented baffle system in which pressure exerted by the build up of gases in the space may be alleviated. Both U.S. Pat. Nos. 5,252,205 and 5,597,483 are incorporated by reference.

Each of these existing baffle designs, while effective at reducing the TSS % exiting through the effluent channel, still exhibit a number of drawbacks. For example, the existing baffle designs do not perform well when the flow through the clarifier tank is low. Furthermore, the performance of these baffles depends upon their location relative to the sludge blanket, but the sludge blanket height is often unknown or changes. Yet another drawback is that the performance of existing baffle designs become unstable when the flow changes suddenly, such as after a rain storm, resulting in an increase in solids entering into the effluent channel.

OBJECTS AND SUMMARY

The present invention looks to overcome the drawbacks associated with the prior art and to provide an improved baffle design for clarifier tanks that is more effective in redirecting the flow of the density currents and the solids back toward the center of the tank, resulting in an improvement (reduction) in TSS over existing baffle designs.

To this end, the present invention is directed to a density current baffle for use in a clarifier tank. The density current baffle has a first baffle portion with lower and upper ends. The lower end of the baffle portion is coupled to a side wall of the clarifier tank. The upper end of the baffle portion is disposed away from the side wall of the clarifier tank so that between the lower end and the upper end of the baffle, the baffle portion is curved such that the upper end curves inward towards the center of the tank.

BRIEF DESCRIPTION OF THE DRAWINGS

The present invention can be best understood through the following description and accompanying drawings, wherein.

DETAILED DESCRIPTION

Figure 1:
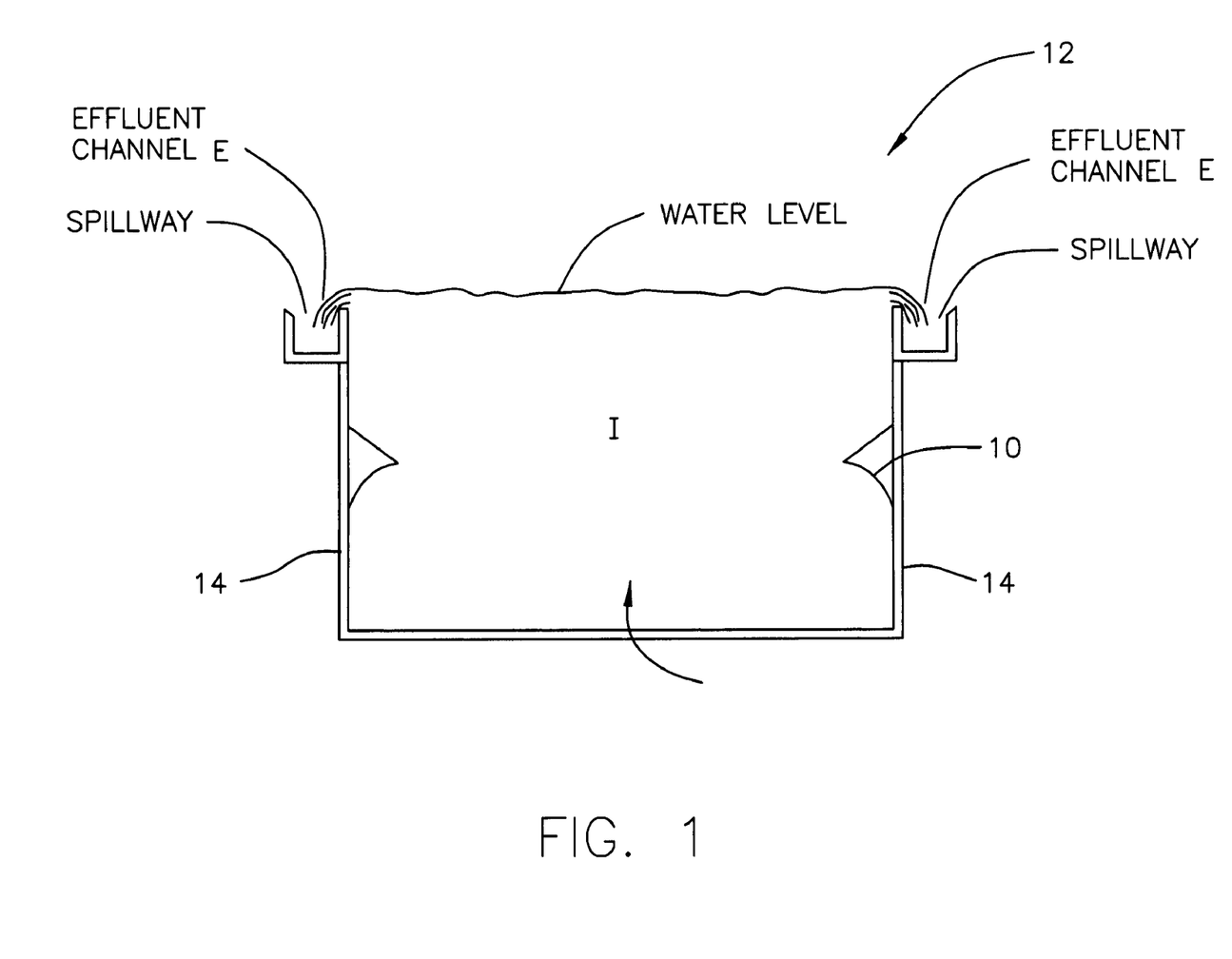
FIG. 1 illustrates an exemplary curved baffle in a clarifier tank, according to one embodiment.

In one embodiment, as illustrated in FIG. 1, a curved density current baffle 10 is shown within a clarifier tank 12. As shown, clarifier tank 12 is a typical clarifier tank having a central tank portion T, and outer wall 14 and an effluent channel E. Curved density current baffle 10 is typically located along outer wall 14 several feet (eg. 3 ft.) below the water level which is usually substantially aligned with the level of the spillway into the effluent channel.

It is understood that baffle 10 may be employed in other shaped tanks 12 and may be employed at various heights along tank walls. However, for the purposes of illustration, the salient features of density current baffle 10 are described below in conjunction with a typical round clarifier tank having a radius of substantially 100 ft, with a height of tank wall 14 ft.

Figure 2:
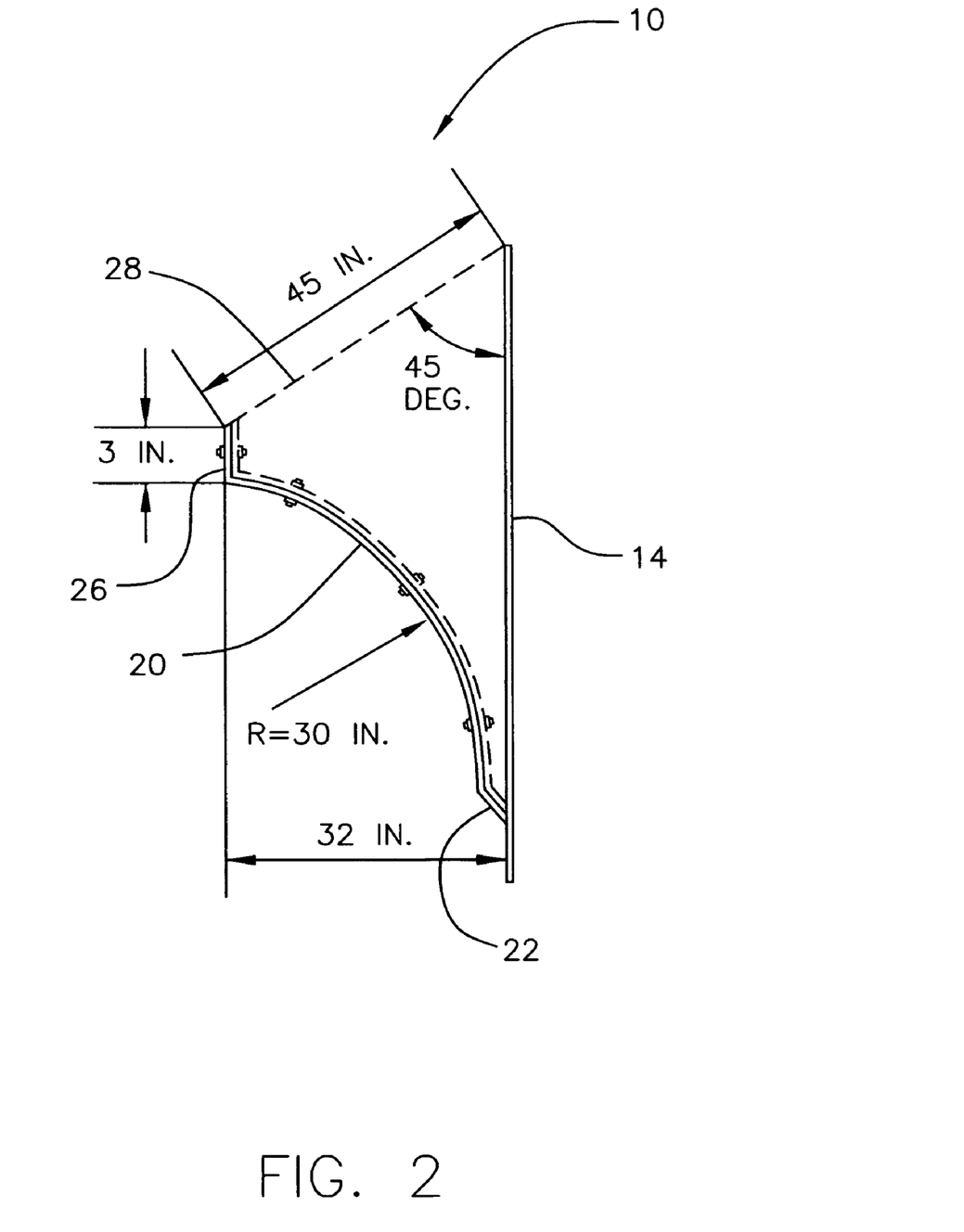
FIG. 2 illustrates an exemplary curved baffle from FIG. 1, according to one embodiment.

As illustrated in FIG. 2, density current baffle 10 maintains a central curved portion 20 that is configured to be attached, at a lower end, to side wall 14. The upper portion extends outward in a curved manner away from side wall 14 towards the center of tank 12. In one arrangement, the radius of curvature of central curved portion 20 is substantially 30", however, the invention is not limited in this respect. Any angle of curvature may be used that is sufficient to provide an improved flow of solid waste towards the center of tank 12 as discussed in more detail below.

In one arrangement, an angled attachment panel 22 may be coupled to the lower end of central curved portion 20 in order to couple this lower end to tank wall 14. At the opposite upper end of central curved portion 20 is an angled end flange 26 that turns upward from the curved portion, substantially parallel to tank wall 14, and is configured to both provide a stable end to central curved portion 20 as well as to provide a convenient mounting arm for coupling baffle 10 to tank wall 14 using an attachment bracket 28.

Figure 3:
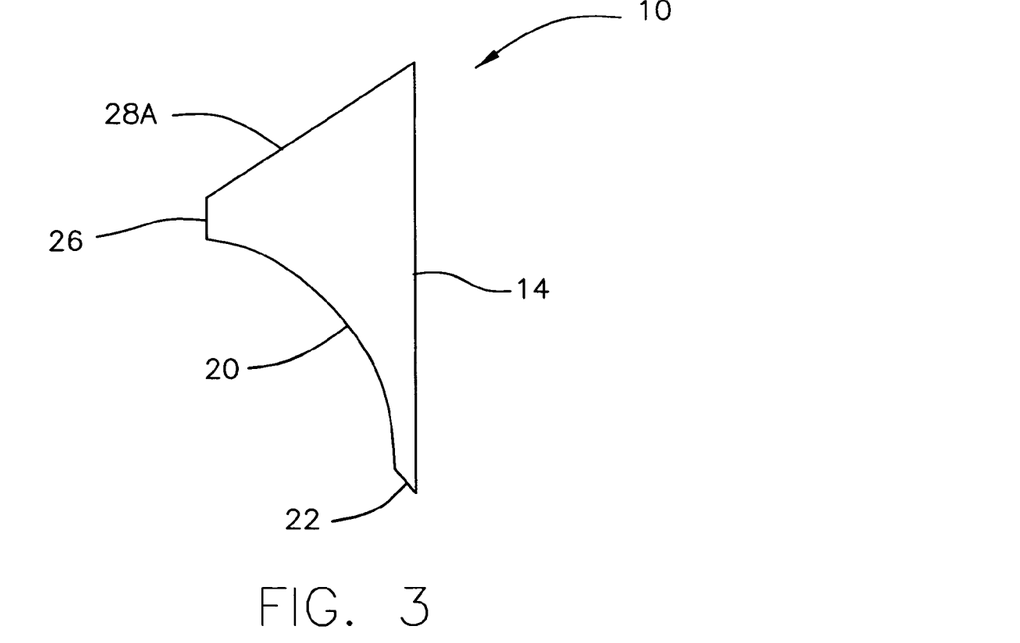
FIG. 3 illustrates an alternative curved baffle, according to another embodiment.

In another arrangement as shown in FIG. 3, instead of attachment bracket 28 being an independent and periodically disposed support device, attachment bracket 28 may be configured as a closed or complete panel/bracket 28a, thereby forming a closed baffle 10 against tank wall 14. Such an arrangement, may assist in preventing sludge and other solid materials from building up behind the curved central baffle portion 20, reducing the need for periodic cleaning.

Figure 4:
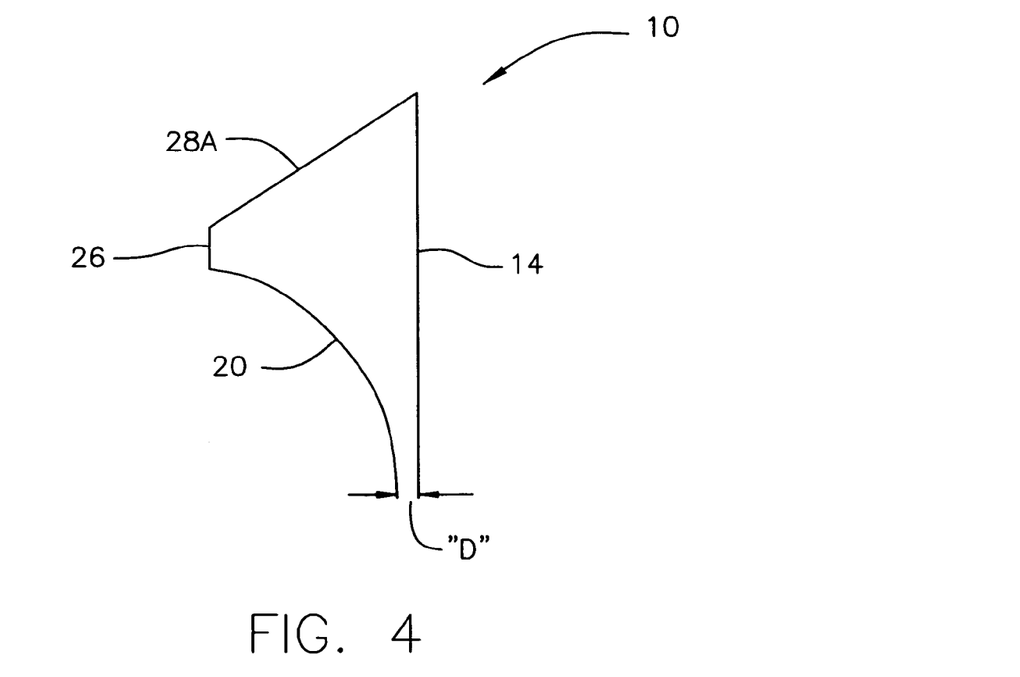
FIG. 4 illustrates an alternative curved baffle, according to another embodiment.
Figure 5:
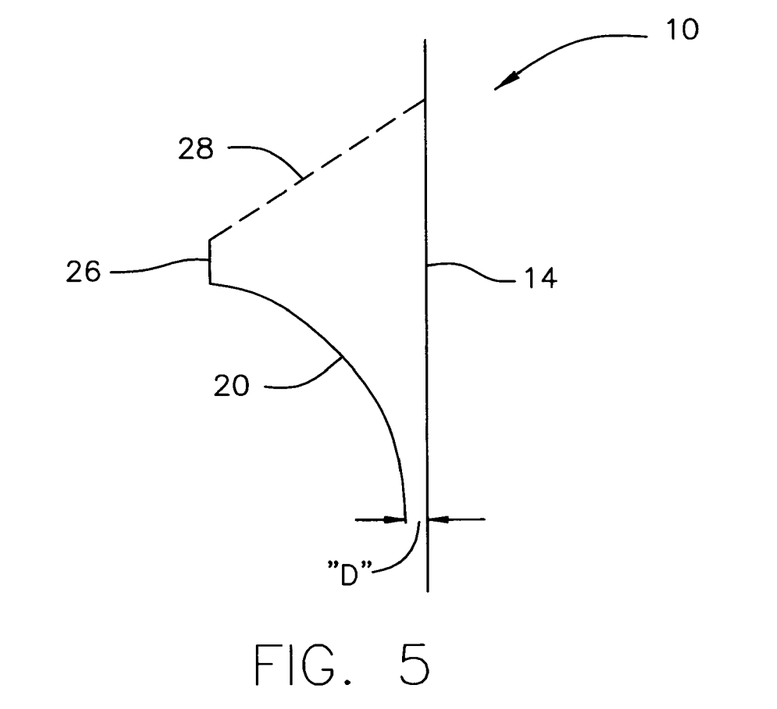
FIG. 5 illustrates an alternative curved baffle, according to another embodiment.

In another arrangement as shown in FIG. 4, baffle 10 may be fitted apart from tank wall 14 for certain distance "D." This can be achieved by simply removing angled attachment panel 22, or it may be done (keeping or removing panel 22 aside) by extending attachment bracket 28. Such an arrangement, may both allow solid waste to escape, by gravity from behind central baffle portion 20, as well assisting in affecting the flow of solids towards the center of tank 12. This arrangement may be affected as shown in FIG. 4 with a closed attachment bracket 28a or with an open bracket 28 as shown in FIG. 5.

Figure 6:
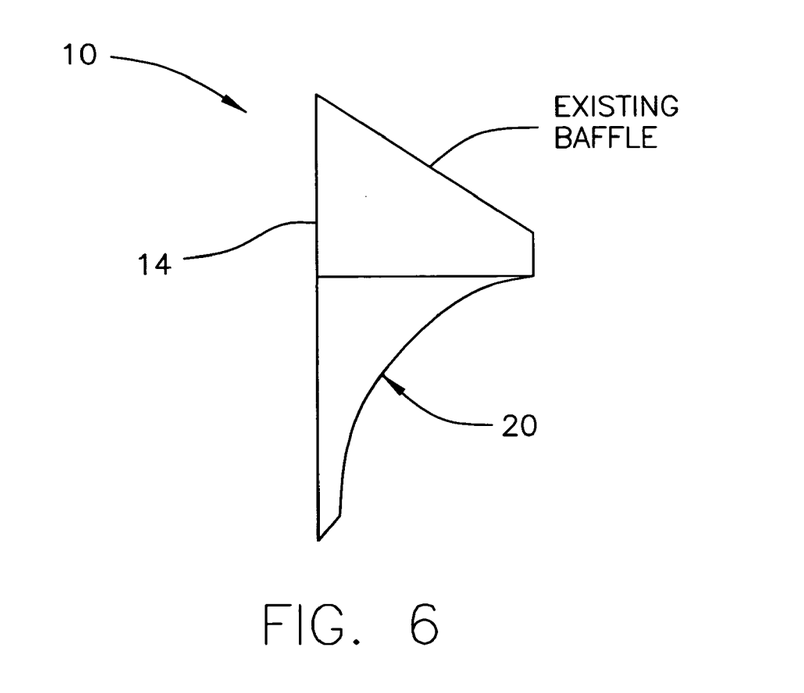
FIG. 6 illustrates an alternative curved baffle, according to another embodiment.

In another arrangement, FIG. 6 shows a curved density current baffle 10 that is retrofitted under a standard downward flat baffle of the prior art, as typically shown in U.S. Pat. No. 5,252,205 to Schaller. In this configuration, curved density current baffle 10 is mounted or fixed against the underside of an existing downward facing flat baffle. Although shown coupled to sidewall 14, it is understood that such a retrofitted arrangement may also employ a gap "D" as shown in FIGS. 4 and 5.

Figures 7A, 7B:
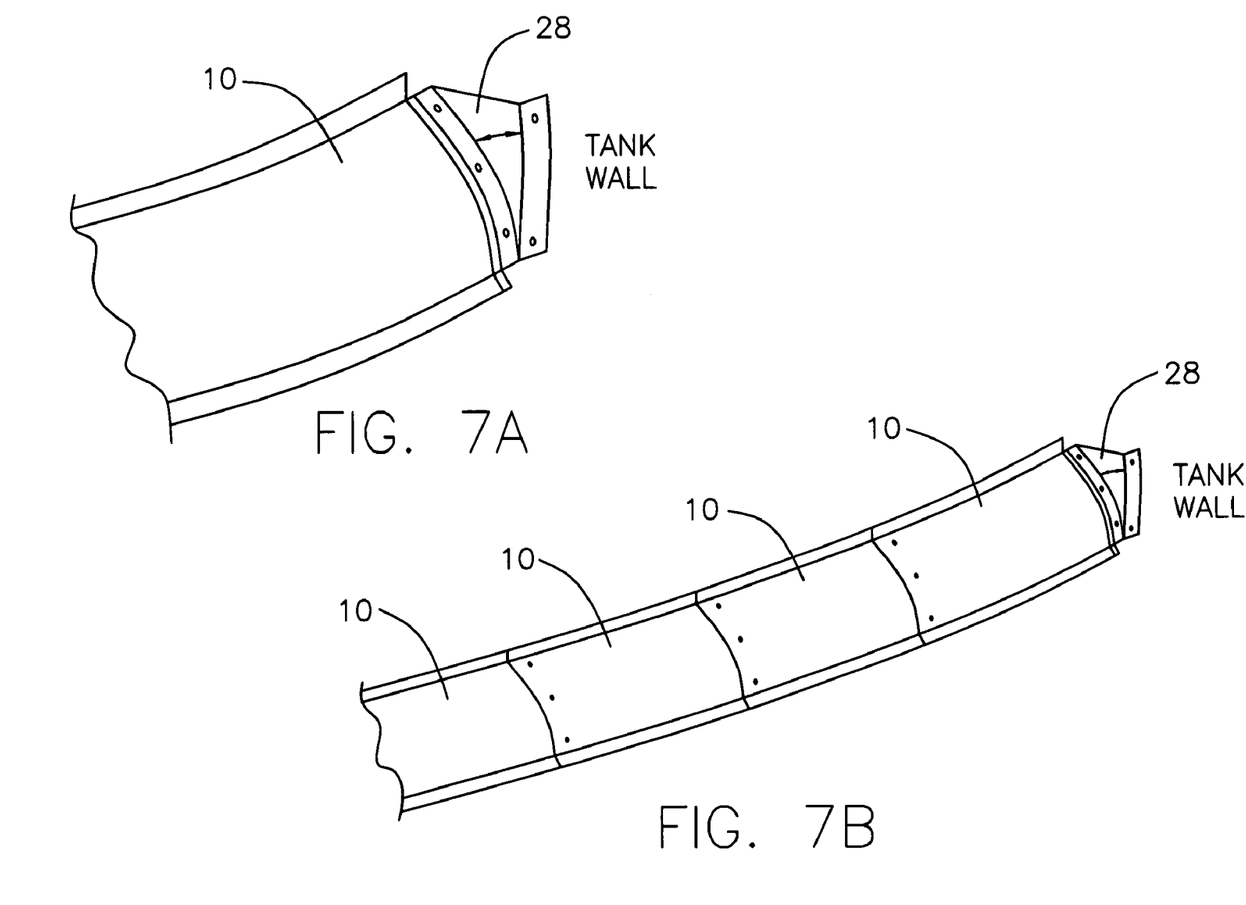
FIGS. 7A and 7B illustrate a series of adjoining curved baffles, according to another embodiment.

It is contemplated that a series of density current baffles 10 and mounting brackets 28 are configure to be supplied around the entire or substantial portion of the circumference of clarifier tank 12. For example, as shown in FIGS. 7A and 7B, baffles 10 may be supplied in a consecutive manner with adjoining edges sharing brackets 28. Adjoining edges of density current baffles 10 may be bolted together and may optionally have overlapping/recessed edge notches for stability.

Figure 8:
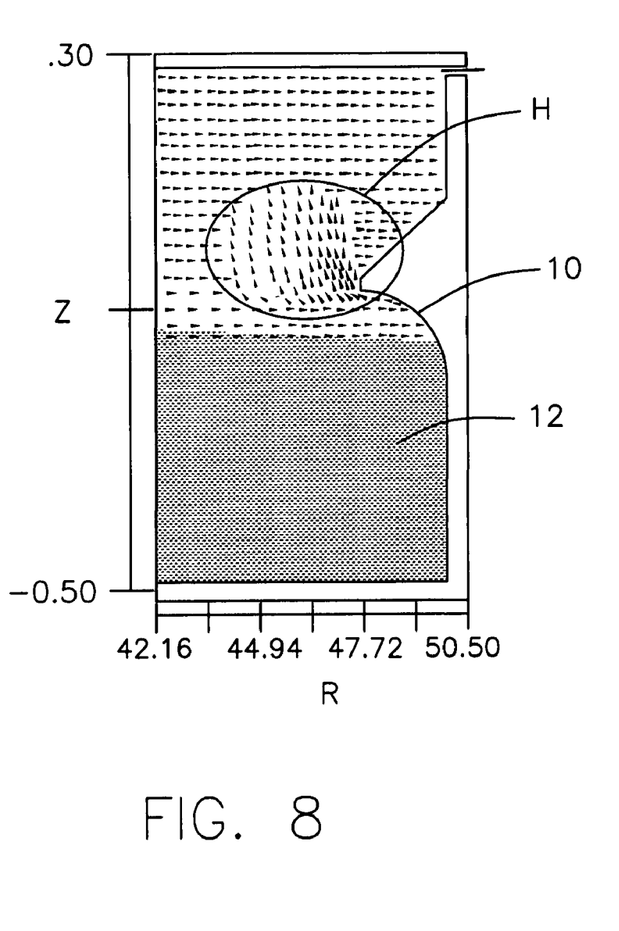
FIG. 8 is a comparison illustration of solid waste flows in a clarifier tank having a curved baffle of the present invention against prior art straight baffles.

Using the design for density current baffle 10, as illustrated in FIG. 2 as an exemplary model, FIG. 8 shows a side by side comparison of the flow of solids from the bottom of the tank upwards towards the effluent channel of clarifier tank 12. As noted in the background, the main purpose of clarifier density baffles is to direct the current of solids back towards the center of tank 12 in order to reduce the flow of solid waste exiting into the effluent channel. As seen in the highlighted area "H" in the flow diagram, density current baffle 10 of the present invention provides an improved solid flow back towards the center of the tank in comparison to the prior art downward facing flat baffles which, while providing some center-ward direction of solids, allows a significant portion to curl back towards the effluent channel after flowing over the tip of the baffle.

Figure 9:
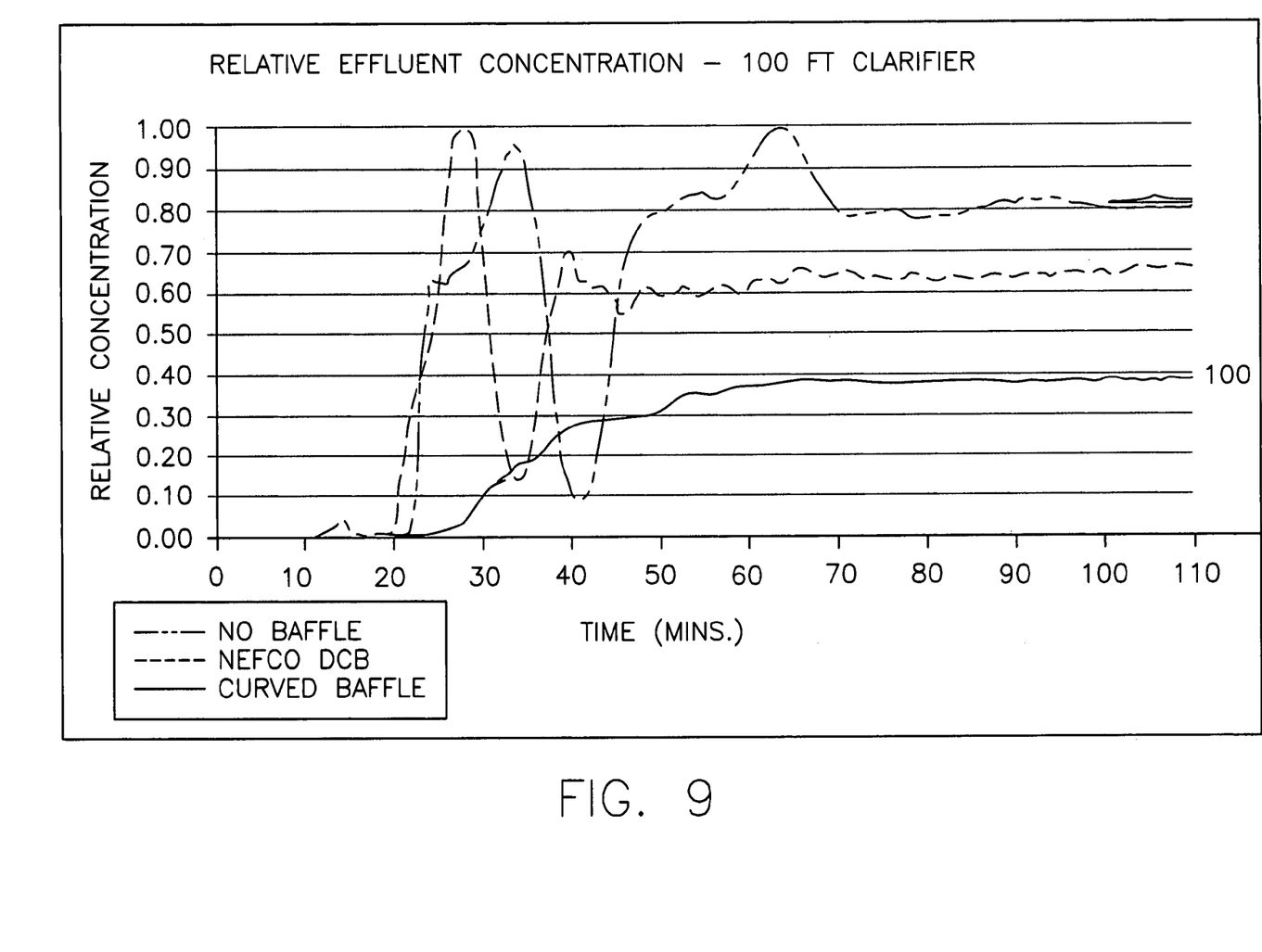
FIG. 9 is a comparison of relative TSS reduction in the effluent channels in a clarifier tank having a curved baffle of the present invention against prior art straight baffles.

FIG. 9 is a chart, based on computer modeled flow results, showing the relative reduction in the concentration of suspended solids in the effluent channel. The first line on the chart, labeled NB, shows the test results for a clarifier tank having no density baffle. The second line labeled NEFCO DCB shows the effluent TSS reduction using an inclined straight density baffle such as those described in the prior art. According to the model results, this baffle reduces total suspended solids by approximately 37% over the case with no baffle. This reduction, calculated by the mathematical modeling process using the prior art baffle, is consistent with actual test results from prior installations and assist in confirming that the test parameters were properly established.

According to one embodiment of the present invention, the lowest line in the chart on FIG. 9, labeled 100, represents the model test results for a baffle design according to the present arrangement of density current baffle 10, such as that shown in FIG. 2. These results demonstrate two significant advantages in the performance of density current baffle 10 over the prior art baffle(s) as follows.

First, the curved density current baffle 10 reduced solids by 91% over the case with no baffle, and 54% over the case of prior art straight baffle(s), both of which represent very significant improvements in clarifier performance. Secondly, the wide variations in effluent solids on the "NB" (no baffle) and "NEFCO DCB" (prior art) graph lines early in the time sequence are caused by random transients that are induced by the model. In contrast, the curved baffle, such as density current baffle 10 provides a damping action that limits the impact of these transients on effluent solids. This is particularly important in reducing solids overflow after events which disturb the normal flow rates such as heavy rain storms.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A density current baffle for use in a clarifier tank, said density baffle comprising:

a first baffle portion having a lower end, an upper end and an intermediate central portion, said lower end of said baffle portion being coupled to a side wall of said clarifier tank, said upper end of said baffle portion being disposed away from said side wall of said clarifier tank, wherein at said intermediate central portion between said lower end and said upper end, said baffle portion is curved such that said upper end curves inward towards the center of said tank.

2. The density current baffle as claimed in claim 1, wherein said lower end of said baffle portion further maintains an angled attachment portion for attachment to said sidewall of said tank.

3. The density current baffle as claimed in claim 1, wherein said upper end is provided with an end flange for receiving a mounting bracket, said mounting bracket having a first end coupled to said end flange and a second end coupled to said side wall of said tank wall.

4. Thee density current baffle as claimed in claim 3, wherein said mounting bracket is a solid bracket.

5. The density current baffle as claimed in claim 1, wherein said intermediate central portion defines a radius in the range of about 30 inches. wall, thereby defining a gap.

6. The density current baffle as claimed in claim 1, wherein said lower end of said first baffle portion is spaced apart from said tank wall, thereby defining a gap.

7. A density current baffle for use in a clarifier tank, said density baffle comprising:
   a downwardly angled panel member having a first end coupled to said tank wall and a second end extending away from said tank wall; and
   a baffle portion having a lower end and an upper end coupled to said second end of said downwardly angled panel member, said baffle portion defining an intermediate central portion, said lower end of said baffle portion being coupled to a side wall of said clarifier tank, said upper end of said baffle portion being disposed away from said side wall of said clarifier tank and coupled to said second end of said downwardly angled panel member, wherein at said intermediate central is curved such that said upper end curves inward towards the center of said tank.

8. A density current baffle for use in a clarifier tank, said tank having a downwardly angled panel member having a first end coupled to said tank wall and a second end extending away from said tank wall, said density baffle comprising:
   a baffle portion having a lower end and an upper end coupled to said second end of said downwardly angled panel member, said baffle portion defining an intermediate central portion, said lower end of said baffle portion being coupled to a side wall of said clarifier tank, said upper end of said baffle portion being disposed away from said side wall of said clarifier tank and coupled to the second end of said downwardly angled panel member, wherein at said intermediate central is curved such that said upper end curves inward towards the center of said tank.

* * * * *